United States Patent
Sugawara

(10) Patent No.: US 12,293,544 B2
(45) Date of Patent: May 6, 2025

(54) INFORMATION PROCESSING SYSTEM, INFORMATION PROCESSING METHOD, AND RECORDING MEDIUM

(71) Applicant: Safie Inc., Tokyo (JP)

(72) Inventor: Hiroaki Sugawara, Tokyo (JP)

(73) Assignee: Safie Inc., Tokyo (JP)

( * ) Notice: Subject to any disclaimer, the term of this patent is extended or adjusted under 35 U.S.C. 154(b) by 62 days.

(21) Appl. No.: 18/120,107

(22) Filed: Mar. 10, 2023

(65) Prior Publication Data

US 2024/0070907 A1   Feb. 29, 2024

(30) Foreign Application Priority Data

Aug. 24, 2022   (JP) .................................. 2022-133355

(51) Int. Cl.
| | |
|---|---|
| *H04N 19/46* | (2014.01) |
| *G06T 7/73* | (2017.01) |
| *G06V 20/40* | (2022.01) |
| *G06V 20/52* | (2022.01) |
| *H04N 7/18* | (2006.01) |

(52) U.S. Cl.
CPC ................ *G06T 7/74* (2017.01); *G06V 20/40* (2022.01); *G06V 20/52* (2022.01); *H04N 7/181* (2013.01); *G06T 2207/10016* (2013.01); *G06T 2207/30244* (2013.01); *G06V 2201/07* (2022.01)

(58) Field of Classification Search
CPC .......... G06T 7/74; G06V 20/52; G06V 20/40; H04N 7/181
See application file for complete search history.

(56) References Cited

U.S. PATENT DOCUMENTS

| | | | |
|---|---|---|---|
| 2011/0295970 A1* | 12/2011 | Miyazawa ............ | G06F 9/5055 709/217 |
| 2016/0345082 A1* | 11/2016 | Armstrong .............. | H04Q 9/00 |
| 2017/0017859 A1* | 1/2017 | Uchiyama ............. | G06F 18/256 |
| 2020/0193643 A1* | 6/2020 | Hess ..................... | G06V 10/44 |
| 2021/0019913 A1* | 1/2021 | Huang .................. | G06T 7/80 |
| 2021/0105441 A1* | 4/2021 | Gasior ................... | H04N 5/77 |
| 2021/0142087 A1* | 5/2021 | Ishii ...................... | G06V 40/10 |
| 2021/0333107 A1* | 10/2021 | Syrstad ............... | G06V 20/182 |
| 2022/0270358 A1* | 8/2022 | Cox ..................... | G06V 10/811 |
| 2023/0064953 A1* | 3/2023 | Iwai ..................... | G06V 20/52 |
| 2023/0410422 A1* | 12/2023 | Aron ..................... | G01B 11/25 |

FOREIGN PATENT DOCUMENTS

| | | |
|---|---|---|
| JP | 2011-160205 A | 8/2011 |
| JP | 2020-113964 A | 7/2020 |
| JP | 2020-188449 A | 11/2020 |
| WO | WO2019230049 A1 | 12/2019 |

\* cited by examiner

*Primary Examiner* — Jonathan R Messmore
(74) *Attorney, Agent, or Firm* — Studebaker Brackett PLLC

(57) ABSTRACT

An information processing system providing a service by using a video captured by an imaging device includes a processor; and a storage storing instructions causing the processor to execute processes of: acquiring video data from the imaging device, estimating an installation angle of the imaging device based on the video data, generating a detection model for detecting a predetermined target from the video based on the installation angle, and providing the service by inputting the video data to the detection model.

12 Claims, 11 Drawing Sheets

FIG. 5

| DEVICE ID | AZIMUTHAL ANGLE | ELEVATION ANGLE | VIDEO DATA | CORRECT DATA |
|---|---|---|---|---|
| D001 | $\theta_{11}$ | $\theta_{21}$ | DATA001.MOV | GT001 |
| D002 | $\theta_{12}$ | $\theta_{22}$ | DATA002.MOV | GT002 |
| D003 | $\theta_{13}$ | $\theta_{23}$ | DATA003.MOV | GT003 |
| ...... | ...... | ...... | ...... | ...... |

| USER ID | DEVICE ID | SERVICE ID | DETECTION MODEL ID |
|---|---|---|---|
| U001 | D001 | S001 | MD001 |
| U002 | D002 | S002 | MD002 |
| U003 | D003 | S003 | MD003 |
| ..... | ..... | ..... | ..... |

DB2

INFORMATION PROCESSING SYSTEM, INFORMATION PROCESSING METHOD, AND RECORDING MEDIUM

CROSS-REFERENCE TO RELATED APPLICATIONS

This nonprovisional application claims priority under 35 U.S.C. § 119(a) on Patent Application No. 2022-133355 filed in Japan on Aug. 24, 2022, the entire contents of which are hereby incorporated by reference.

FIELD

The present invention relates to an information processing system, an information processing method, and recording medium.

BACKGROUND

In the related art, a technology of detecting the entrance and exit of people or vehicles by the video of a security camera is known (for example, refer to Japanese Patent Application Laid-Open No. 2020-113964).

In such a technology, it is possible to provide a service to a user by using a detection model such as AI.

However, for example, in a case where there is a change in an installation environment of the imaging device, such as a change in the direction of the security camera due to a natural disaster such as the typhoon or the earthquake, in the previous detection model, there is a possibility that accurate detection is not available.

The present invention has been made in consideration of such circumstances, and an object thereof is to provide a service by using a suitable detection model even in a case where there is a change in an installation environment of an imaging device.

An information processing system of the present disclosure is an information processing system providing a service by using a video captured by an imaging device includes a processor; and a storage storing instructions causing the processor to execute processes of: acquiring video data from the imaging device, estimating an installation angle of the imaging device based on the video data, generating a detection model for detecting a predetermined target from the video based on the installation angle, and providing the service by inputting the video data to the detection model.

According to the present disclosure, even in a case where there is a change in the installation environment of the imaging device, it is possible to provide the service by using a suitable detection model.

The above and further objects and features of the invention will more fully be apparent from the following detailed description with accompanying drawings.

BRIEF DESCRIPTION OF DRAWINGS

FIG. 5 is a conceptual diagram illustrating a configuration example of a video database;

FIG. 6 is a conceptual diagram illustrating a configuration example of a user database;

DESCRIPTION OF EMBODIMENTS

Hereinafter, the present invention will be described in detail, based on the drawings representing an embodiment of the present invention.

Figure 1:
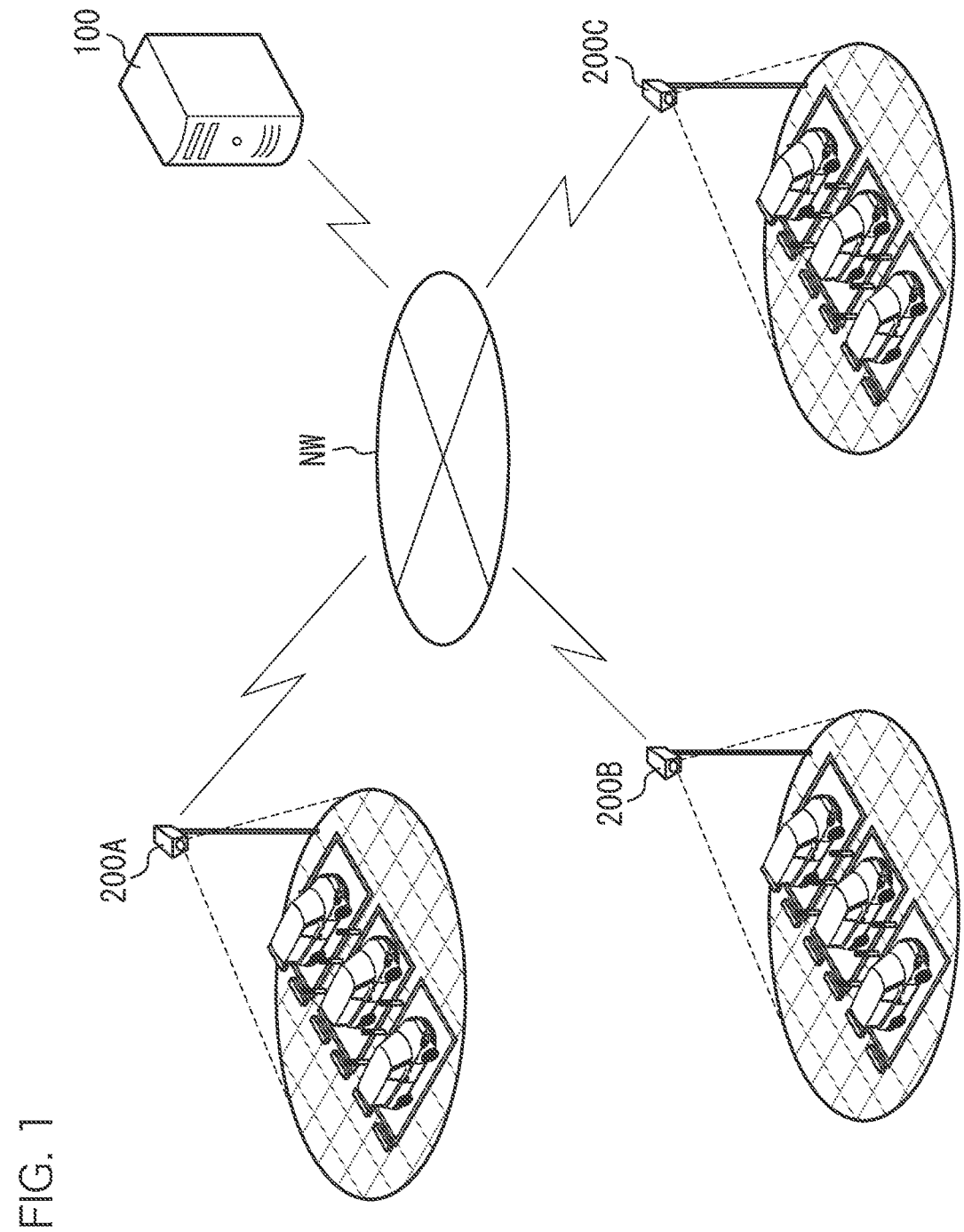
FIG. 1 is a schematic view illustrating a configuration of an information processing system according to an embodiment.

FIG. 1 is a schematic view illustrating the configuration of an information processing system according to an embodiment. The information processing system according to this embodiment includes a server 100, and a plurality of imaging devices 200A, 200B, and 200C. The server 100 and the imaging devices 200A to 200C are connected through a communication network NW such that communication can be performed to each other. In the example of FIG. 1, three imaging devices 200A to 200C are illustrated, but the number of imaging devices is not limited, and one or two imaging devices may be connected, or four or more imaging devices may be connected. In the following description, in a case where it is not necessary to discriminate the imaging devices 200A to 200C from each other, the imaging devices 200A to 200C will be simply described as the imaging device 200. The internal configuration of the server 100 will be described by using FIG. 2, and the internal configuration of the imaging device 200 will be described by using FIG. 7.

The server 100 is a server device having a function of storing and managing video data that is output from the imaging device 200, a function of providing a predetermined service to a user of the imaging device 200, and the like. The server 100 acquires the video data from the imaging device 200, estimates an installation angle of the imaging device 200 based on the acquired video data, stores the video data associated with the estimated installation angle, and manages the video data. The installation angle of the imaging device 200 is a parameter for uniquely setting an imaging direction (an optical axis of a camera), and is represented by an azimuthal angle of 0 degrees to 360 degrees and an elevation angle of −90 degrees to 90 degrees. In addition, the server 100 acquires the video data from a plurality of imaging devices 200, and thus, is capable of collecting the video data from the plurality of imaging devices 200 of which the installation angles are substantially the same.

The server 100 generates a learning model to be used by the user of the imaging device 200, by using the collected video data in training data. For example, the server 100 is capable of generating the learning model for detecting vehicles entering or exiting a parking lot, people walking outside, building materials to be carried into or out of a building site, and the like from the video data. A detection target is not limited to the above, and can be arbitrarily set. The server 100 inputs the video data acquired by the imaging device 200 to the learning model, and executes the computation of the learning model, thereby providing information of the detected detection target to the user of the imaging device 200.

Figure 2:
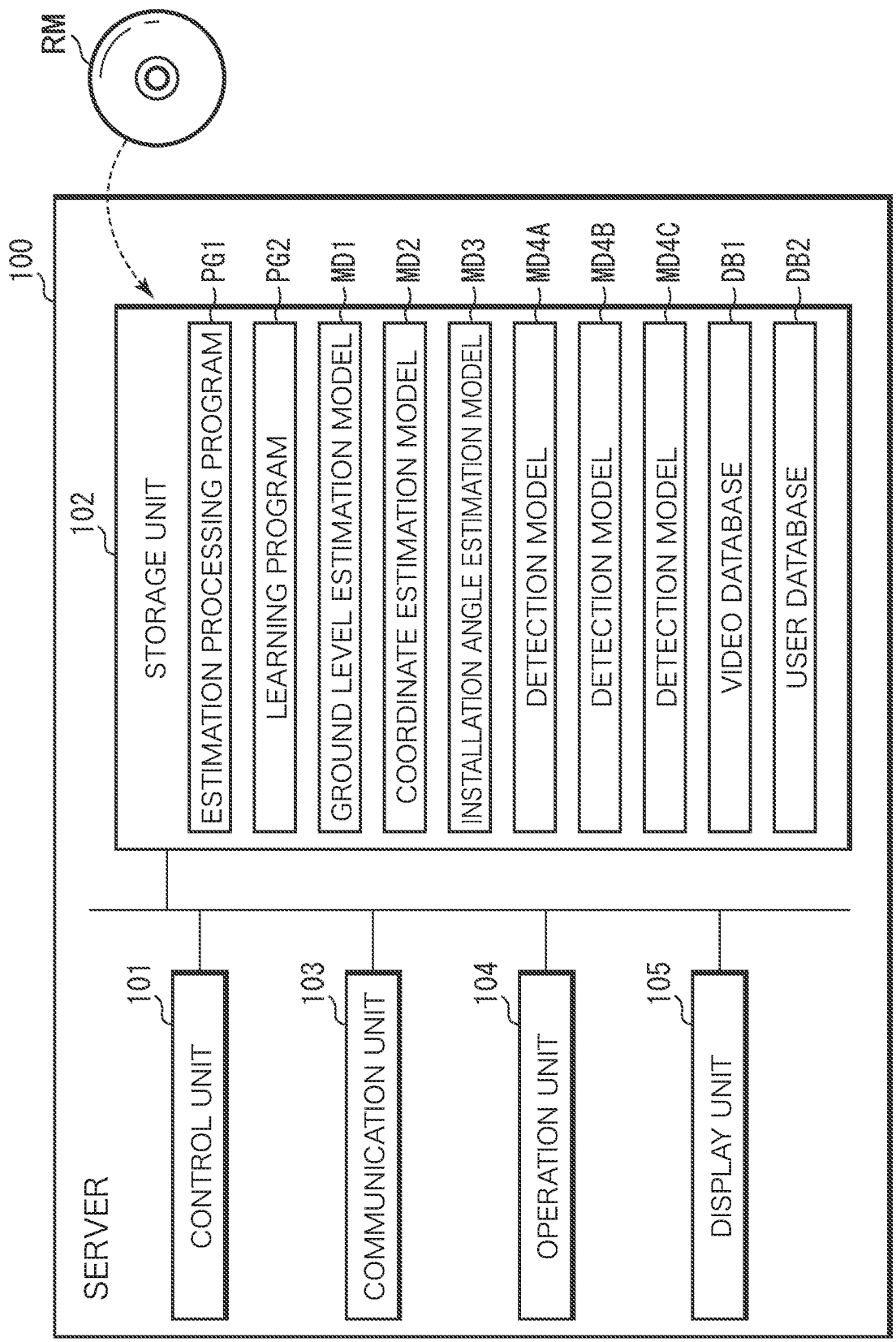
FIG. 2 is a block diagram illustrating an internal configuration of a server device.

FIG. 2 is a block diagram illustrating the internal configuration of the server 100. The server 100, for example, is a general-purpose or dedicated server computer, and includes a control unit 101, a storage unit 102, a communication unit 103, an operation unit 104, a display unit 105, and the like.

The control unit 101 includes a central processing unit (CPU), a read only memory (ROM), a random access memory (RAM), and the like. The CPU of the control unit 101 controls the operation of various hardwares described above by decompressing and executing various programs stored in the ROM or the storage unit 102 in the RAM, and allows the entire device to function as an information processing device (a computer) of the present application.

The control unit 101 is not limited to the configuration described above, and may be a graphics processing unit (GPU), a field programmable gate array (FPGA), or a computation circuit or a control circuit including one or a plurality of volatile or non-volatile memories, or the like. In addition, the control unit 101 may have the function of a clock that outputs date and time information, a timer that measures the elapsed time from a measurement start instruction to a measurement end instruction, a counter that counts the number, or the like.

The storage unit 102 includes a storage device using a hard disk, a flash memory, or the like. The storage unit 102 stores a computer program that is executed by the control unit 101, various data pieces acquired from the outside, various data pieces generated in the device, and the like.

The computer program that is stored in the storage unit 102 includes an estimation processing program PG1 for estimating the installation angle of the imaging device 200, based on the video data acquired from the imaging device 200, a learning program PG2 for generating the learning model described below, and the like. Each of the computer programs may be a single computer program, or may be one computer program including a plurality of computer programs. In addition, the existing library may be partially used in the computer programs.

Various computer programs including the estimation processing program PG1 and the learning program PG2 are provided by a non-transitory recording medium (a program product) RM in which the computer programs are recorded to be readable. The recording medium RM, for example, is a portable memory such as a CD-ROM, a universal serial bus (USB) memory, a secure digital (SD) card, a micro SD card, and a compact flash (Registered Trademark). The control unit 101 reads various computer programs from the recording medium RM by using a reading device that is not illustrated, or installs the read computer program in the storage unit 102. Alternatively, various computer programs including the estimation processing program PG1 and the learning program PG2 may be provided by communication. In this case, the control unit 101 may acquire various computer programs by communication through the communication unit 103, and may install the acquired computer program in the storage unit 102.

The storage unit 102 includes various learning models. In this embodiment, as the learning model, for example, a ground level estimation model MD1, a coordinate estimation model MD2, an installation angle estimation model MD3, and detection models MD4A to MD4C are provided. In the storage unit 102, configuration information of a layer of each of the learning models, information of a node included in each layer, and a model parameter such as weighting or bias between the nodes are stored.

The storage unit 102 includes a video database DB1 for storing the video data acquired from each of the imaging devices 200, and a user database DB2 for storing information relevant to the user of each of the imaging devices 200.

The communication unit 103 includes a communication interface for connecting to the communication network NW. The interface included in the communication unit 103, for example, is a communication interface based on a wireless communication standard, such as WiFi (Registered Trademark), 3G, 4G, 5G, and long term evolution (LTE). The communication unit 103 transmits various information pieces to be notified to the outside, and receives various information pieces to be transmitted to the own device from the outside.

The operation unit 104 includes an input device such as a keyboard and a mouse, and receives the input of various information pieces. The control unit 101 performs suitable control, based on information that is input from the operation unit 104, and as necessary, stores the input information in the storage unit 102.

The display unit 105 includes a display device such as a liquid crystal display panel and an organic EL display panel, and displays information to be notified to a manager or the like, based on a control signal that is output from the control unit 101.

It is not necessary that the server 100 is a single computer, but the server device may be a computer system including a plurality of computers or peripheral devices. For example, the computer system may include a first server that stores and manages the video data from the imaging device 200, a second server that estimates the installation angle from the video data, and a third server that provides the service to the user of the imaging device 200. In addition, the server 100 may be a virtual machine that is virtually constructed by software.

In this embodiment, the server 100 includes the detection models MD4A to MD4C, but the learned detection models MD4A to MD4C may be installed in an external server device. In addition, the learned detection models MD4A to MD4C may be installed in the corresponding imaging devices 200A to 200C, or may be provided in a terminal device that is used by the user.

In addition, in this embodiment, the server 100 includes the video database DB1 and the user database DB2, but the video database and the user database may be provided outside the server 100 insofar as the video database and the user database can be accessed from the server 100.

Hereinafter, the configuration of various learning models included in the server 100 will be described.

Figure 3:
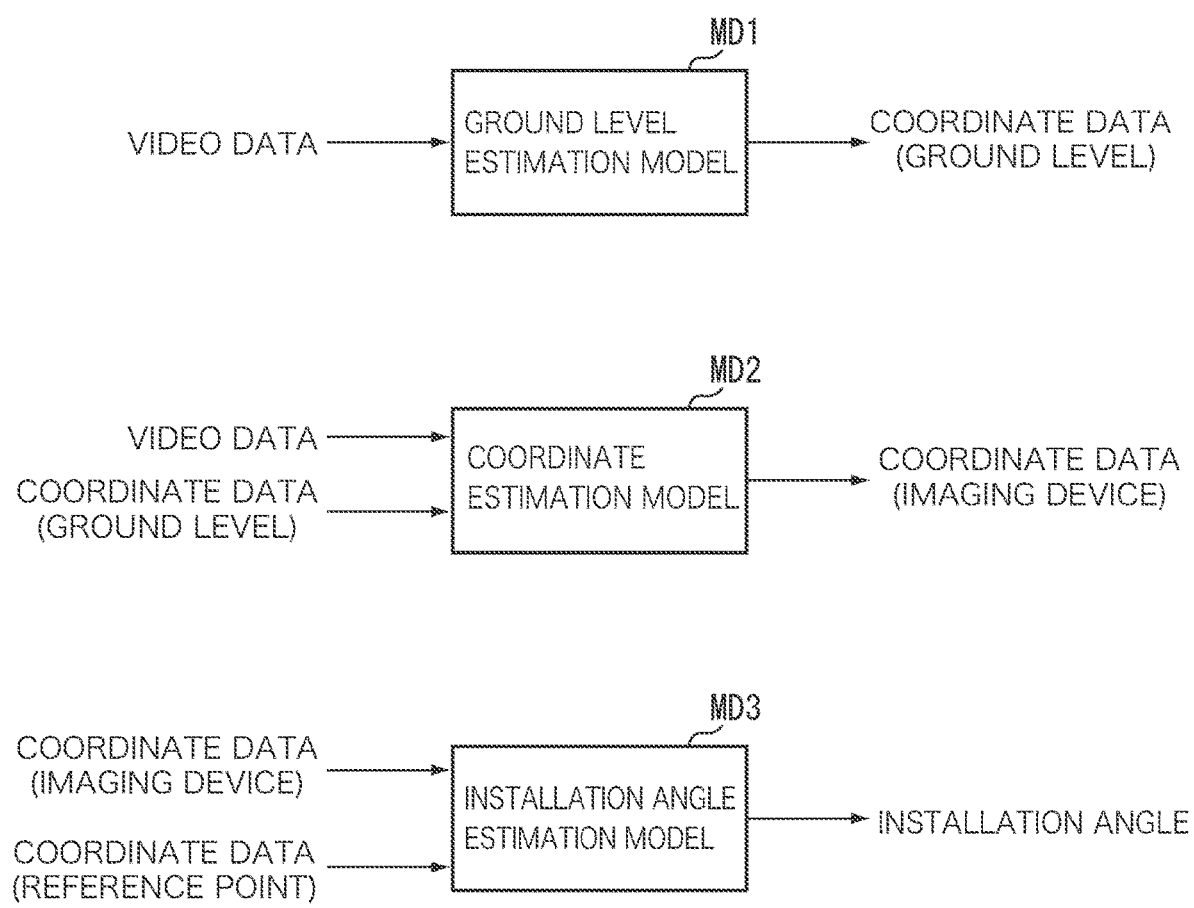
FIG. 3 is a schematic view illustrating a configuration example of a learning model for estimating an installation angle of an imaging device.

FIG. 3 is a schematic view illustrating a configuration example of the learning model for estimating the installation angle of the imaging device 200. The learning model for estimating the installation angle of the imaging device 200 includes the ground level estimation model MD1, the coordinate estimation model MD2, and the installation angle estimation model MD3.

The ground level estimation model MD1 is a learning model estimating the coordinate of the ground level from the video data, and is learned such that coordinate data of the ground level is output in a case where the video data is input from the imaging device 200. As the learning model, a learning model including convolutional neural networks (CNN), region-based CNN (R-CNN), and the like can be used. Alternatively, the learning model may be constructed by using an arbitrary neural network that is subjected to image segmentation, such as SegNet, a fully convolutional network (FCN), a U-shaped network (U-Net), and a pyramid scene parsing network (PSPNet). In addition, the learning model may be constructed by using a neural network for object detection, such as you only look once (YOLO) and a single shot multi-box detector (SSD).

The ground level estimation model MD1 is generated by performing learning with a predetermined learning algorithm, by using a plurality of video data pieces and the coordinate data (correct data) of the ground level designated by an operator with respect to the ground level shown in each of the video data pieces in the training data. Here, as the coordinate data of the ground level that is used for the correct data, for example, the coordinates of four corners of a known rectangular region such as a parking frame as illustrated in FIG. 1 can be used. In this embodiment, the learned learning model is stored in the storage unit 102 as the ground level estimation model MD1.

The coordinate estimation model MD2 is a learning model for estimating a position coordinate of the imaging device 200, and is learned such that coordinate data indicating the position of the imaging device 200 (in particular, an installation height of the imaging device 200) is output in a case where the video data from the imaging device 200 and the coordinate data of the ground level that is estimated by the ground level estimation model MD1 are input. As the learning model, for example, a learning model including CNN, R-CNN, and the like can be used. The coordinate estimation model MD2 is generated by performing learning with a predetermined learning algorithm, by using the plurality of video data pieces, the coordinate data of the ground level, and the position coordinate (a three-dimensional coordinate) of the imaging device 200 designated by the operator in the training data. In this embodiment, the learned learning model is stored in the storage unit 102 as the coordinate estimation model MD2.

The installation angle estimation model MD3 is a learning model for estimating the installation angle of the imaging device 200, and is learned such that information of the installation angle of the imaging device 200 is output in a case where coordinate data of an object to be a reference point shown in the video data and the coordinate data indicating the position of the imaging device 200 estimated by the coordinate estimation model MD2 are input. In this embodiment, the installation angle estimation model MD3 is learned such that information of an azimuthal angle of 0 degrees to 360 degrees based on a predetermined direction (for example, a due south direction) and an elevation angle of −90 degrees to 90 degrees based on the horizontal plane is output. As the learning model, for example, a learning model including CNN, R-CNN, and the like can be used. The installation angle estimation model MD3 is generated by performing learning with a predetermined learning algorithm, by using the coordinate data of the object to be the reference, the coordinate data indicating the position of the imaging device 200 estimated by the coordinate estimation model MD2, and data of the installation angle given by the operator in the training data. Here, the reference point (the object to be the reference) indicates an object of which a three-dimensional coordinate is known within the range of the imaged image. In this embodiment, the learned learning model is stored in the storage unit 102 as the installation angle estimation model MD3.

Figure 4:
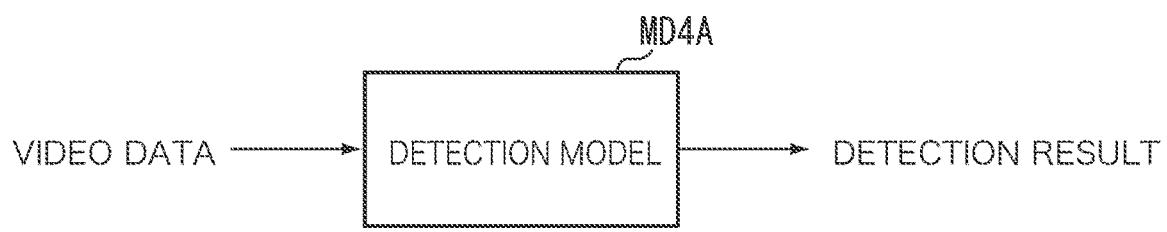
FIG. 4 is a schematic view illustrating a configuration example of a detection model.

FIG. 4 is a schematic view illustrating a configuration example of the detection model MD4A. The detection models MD4A to MD4C, for example, are a learning model for detecting the detection target from the video data. The detection target may be set in accordance with the installation purpose of each of the imaging devices 200. For example, in a case where the imaging device 200A is installed in order to monitor the vehicles entering or exiting the parking lot, the detection model MD4A is learned such that information relevant to the vehicles shown in the video data is output in a case where the video data of the imaging device 200A is input. In addition, in a case where the imaging device 200A is installed in order to monitor the people walking outside, the detection model MD4A is learned such that information relevant to the people shown in the video data is output in a case where the video data of the imaging device 200A is input. The same applies to the detection models MD4B and MD4C, and the detection models are learned such that information relevant to the detection target is output in a case where the video data from each of the imaging devices 200B and 200C is input. The detection models MD4A to MD4C are individually generated corresponding to each of the imaging devices 200A to 200C. The storage unit 102 stores the corresponding detection models MD4A to MD4C in association with a service ID of the service that is used by the user of each of the imaging devices 200A to 200C.

Hereinafter, the configuration of various databases included in the server 100 will be described.

FIG. 5 is a conceptual diagram illustrating a configuration example of the video database DB1. In this embodiment, the video data acquired from each of the imaging devices 200 is stored in the video database DB1, together with an identifier (a device ID) of the imaging device 200, and the installation angle of the imaging device 200. In addition, the correct data described below is also stored in association with the video data. Note that, a set of the video data and the correct data may be referred to as the training data. In the video database DB1, the coordinate data of the ground level, the installation height (the coordinate data) of the imaging device 200, and the coordinate data of the reference point, and the like may be included, in addition to the installation angle of the imaging device 200. Further, in the video database DB1, attribute information of the imaging device 200 such as the user of the imaging device 200, an installation location, the installation purpose, and a communication address, or imaging date and time information may be included.

FIG. 6 is a conceptual diagram illustrating a configuration example of the user database DB2. The user database DB2, for example, stores a user ID for identifying the user, the device ID for identifying the imaging device 200, the service ID for identifying the service that is used by the user, a detection model ID that is used when using the service, and the like in association with each other.

Next, the configuration of the imaging device 200 will be described.

Figure 7:
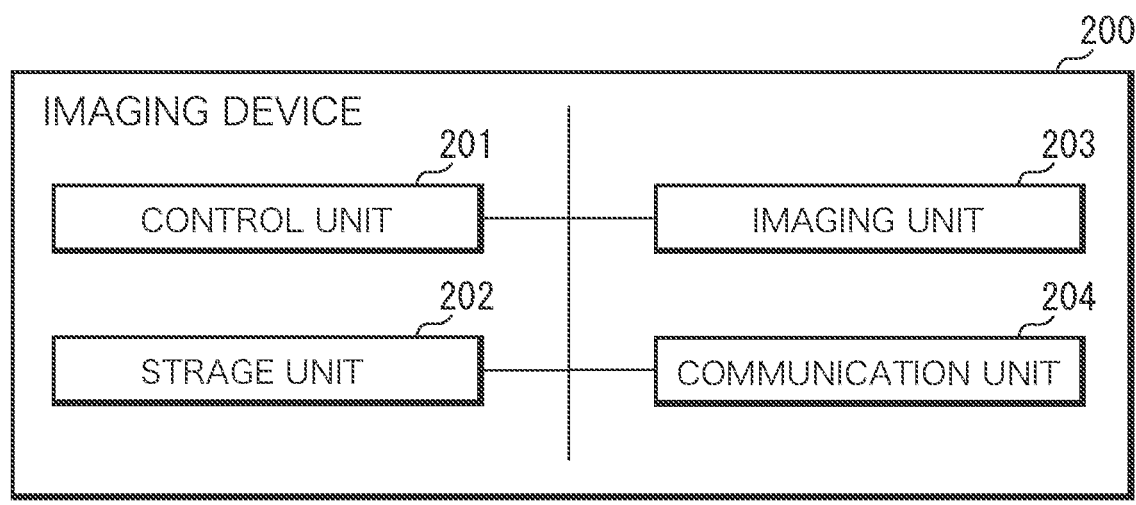
FIG. 7 is a block diagram illustrating an internal configuration of the imaging device.

FIG. 7 is a block diagram illustrating the internal configuration of the imaging device 200. The imaging device 200 is a network camera that can be controlled through the communication network NW, and includes a control unit 201, a storage unit 202, an imaging unit 203, a communication unit 204, and the like.

The control unit 201 includes a CPU, a ROM, and the like, controls the operation of various hardwares described above, and allows the entire device to function as the imaging device of the present application. The storage unit 202 includes a storage device using a flash memory or the like. In the storage unit 202, the information of the installation angle of the own device that is estimated by the server 100 is stored. In the storage unit 202, the attribute information of the imaging device 200 such as the identifier, the user, the installation location, the installation purpose, and the communication address of the imaging device 200 may be stored, in addition to the information of the installation angle.

The imaging unit 203 includes an imaging element such as a complementary metal oxide semiconductor (CMOS) and a charge-coupled device (CCD), and outputs the video data that is obtained by imaging an imaging target. The communication unit 204 includes a communication interface for connecting to the communication network NW. The communication interface included in the communication unit 204, for example, is a communication interface based on a wireless communication standard, such as WiFi (Registered Trademark), 3G, 4G, 5G, and LTE. The communication unit 204 transmits various information pieces to be notified to the outside, and receives various information pieces to be transmitted to the own device from the outside.

Hereinafter, the operation of the information processing system according to this embodiment will be described.

Figure 8:
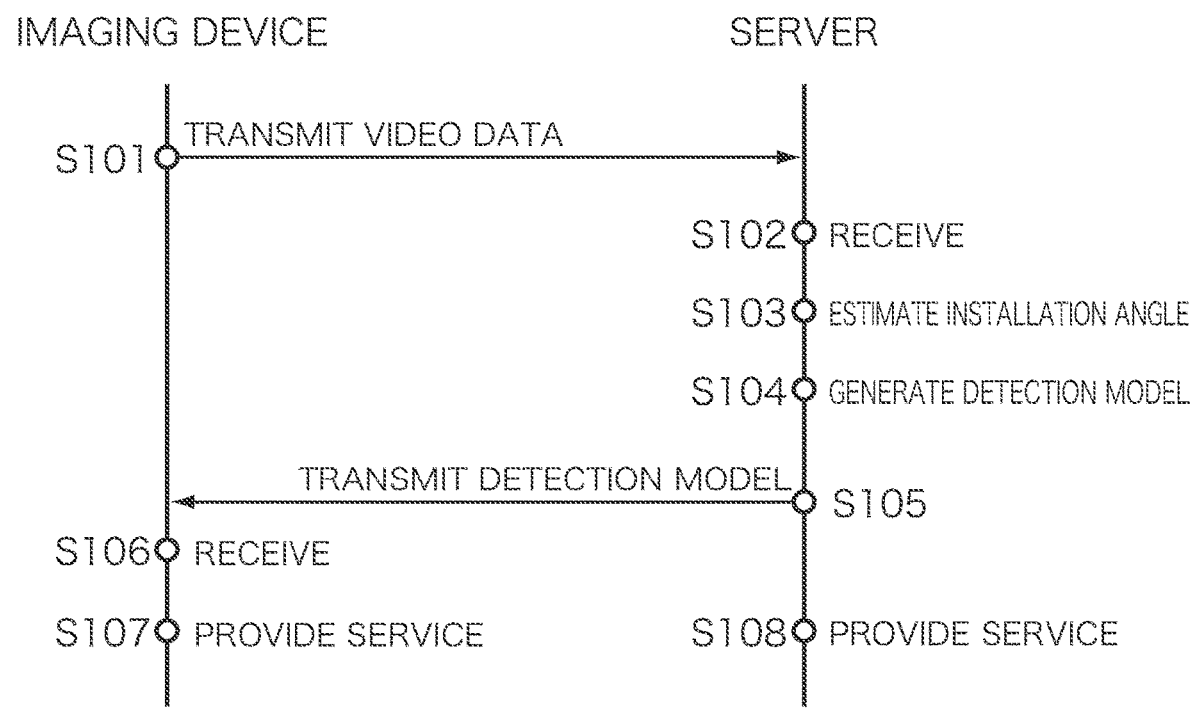
FIG. 8 is a flowchart illustrating the whole image of processing.

FIG. 8 is a flowchart illustrating the whole image of processing. In this processing, steps S101 to S103 are processing that is repeatedly executed at a predetermined time interval when the imaging device 200 is normally operated. In addition, steps S104 to S106 are processing that is executed as necessary in a case where there is a change in the installation angle of the imaging device 200 due to a natural disaster or the like, but may be executed as initial setting when the imaging device 200 is installed. In addition, steps S107 and S108 are processing of executing any service when there is a request for service provision from the user. Note that, in a case where annotation is automatically performed with respect to the video data, steps S101 to S106 may be executed when the imaging device 200 is normally operated. The imaging device 200 transmits video data that is obtained by imaging the imaging target to the server 100 by the communication unit 204 (step S101). The imaging device 200 stores the video data in a file in a predetermined time unit, and transmits the stored file to the server 100. A file format of the video data is arbitrary, and AVI, MPEG2, MPEG4, MOV, FLV, SFS, and the like can be used. In addition, the imaging device 200 may transmit the video data in a streaming format to the server 100, and may store the video data as a file in the server 100. Further, the imaging device 200 may transmit image data of a time-oriented still image to the server 100 as the video data.

The server 100 receives the video data that is transmitted from the imaging device 200 through the communication unit 103 (step S102). The control unit 101 of the server 100 estimates the installation angle of the imaging device 200, based on the received video data (step S103). Processing of estimating the installation angle will be described below in detail by using FIG. 9. Then, as illustrated in FIG. 5, the control unit 101 stores the video data received in step S102 and the information of the installation angle estimated in step S103 in the video database DB1, in association with the device ID.

Next, the control unit 101 generates the detection model, based on the video data received in step S102 and the installation angle estimated in step S103 (step S104). Processing of generating the detection model will be described below in detail by using FIG. 10. The subsequent processing is divided into two cases in accordance with the configuration of the system. The first case is a case where the service is provided on the imaging device 200, and in this case, steps S105 to S107 are executed, and step S108 is omitted. The second case is a case where the service is provided on the server 100, and in this case, steps S105 to S107 are omitted, and step S108 is executed.

In a case where the service is provided on the imaging device 200, the control unit 101 transmits the detection model generated in step S104 to the imaging device 200 by the communication unit 103 (step S105). The detection model that is transmitted by the communication unit 103 reaches the imaging device 200 through the communication network NW.

The imaging device 200 receives the detection model that is transmitted from the server 100 through the communication unit 204 (step S106). The control unit 201 of the imaging device 200 provides the service by using the received detection model (step S107). On the other hand, in a case where the service is provided on the server 100, the control unit 101 provides the service by using the generated detection model (step S108). Processing of providing the service will be described below in detail by using FIG. 11.

Figure 9:
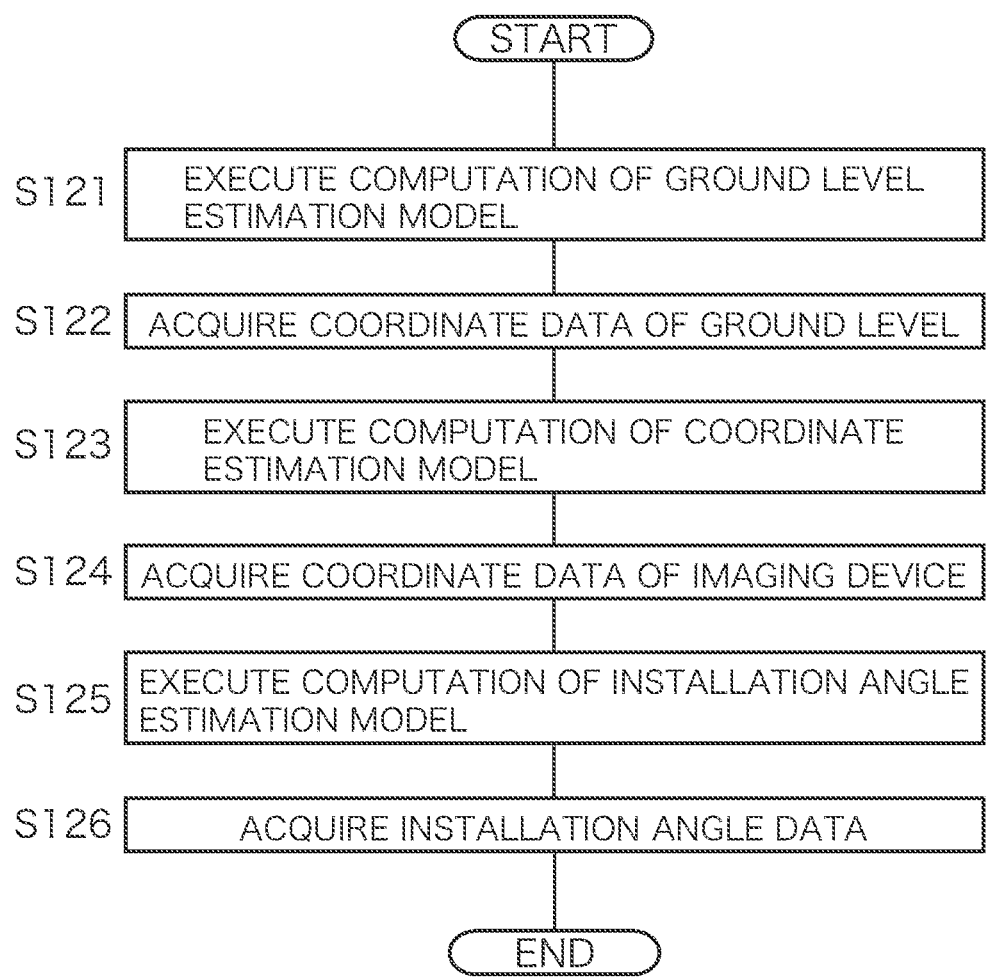
FIG. 9 is a flowchart illustrating the details of processing of estimating the installation angle.

FIG. 9 is a flowchart illustrating the details of the processing (S103) of estimating the installation angle. The control unit 101 of the server 100 reads out the estimation processing program PG1 from the storage unit 102 and executes the program, thereby executing the following processing. The control unit 101 inputs the video data acquired from the imaging device 200 to the ground level estimation model MD1, and executes the computation of the ground level estimation model MD1 (step S121). In this case, the control unit 101 may input a specific frame (a still image) extracted from the video data to the ground level estimation model MD1, or may input the video data after a brightness, image quality, or the like is adjusted to the ground level estimation model MD1. The control unit 101 acquires the coordinate data of the ground level, as a computation result of the ground level estimation model MD1 (step S122).

Next, the control unit 101 inputs the video data acquired from the imaging device 200 and the coordinate data of the ground level to the coordinate estimation model MD2, and executes the computation of the coordinate estimation model MD2 (step S123). As described above, the control unit 101 may input the specific frame (the still image) extracted from the video data to the coordinate estimation model MD2, or may input the video data after the brightness, the image quality, or the like is adjusted to the coordinate estimation model MD2. The control unit 101 acquires the coordinate data indicating the position (the installation height) of the imaging device 200, as a computation result of the coordinate estimation model MD2 (step S124).

Next, the control unit 101 inputs the coordinate data of the imaging device 200 and the coordinate data of the reference point shown in the video data to the installation angle estimation model MD3, and executes the computation of the installation angle estimation model MD3 (step S125). The control unit 101 acquires the data of the installation angle of the imaging device 200, as a computation result of the installation angle estimation model MD3 (step S126).

According to the procedure described above, the control unit 101 of the server 100 is capable of estimating the installation angle of the imaging device 200. As illustrated in FIG. 5, the control unit 101 stores the device ID, the data of the installation angle of the imaging device 200 (acquired in step S126), and the video data acquired from the imaging device 200 in the video database DB1 in association with each other. In a case where there is already the data, the data may be overwritten, or the latest data may be used by storing the data together with the generated date and time information. Note that, the coordinate data of the ground level (acquired in step S122) and the coordinate data of the imaging device 200 (acquired in step S124) may be stored even in association with each other.

In this embodiment, the configuration of estimating the installation angle of the imaging device 200 by using three types of models of the ground level estimation model MD1, the coordinate estimation model MD2, and the installation angle estimation model MD3 has been described, but the installation angle of the imaging device 200 may be estimated from the imaged image by using an integrated model in which the models described above are integrated. That is, the integrated model may be learned such that the installation angle of the imaging device 200 is output in a case where the video data is input.

The control unit 101 generates the detection model MD4A and the like, based on the video data stored in the video database DB1.

Figure 10:
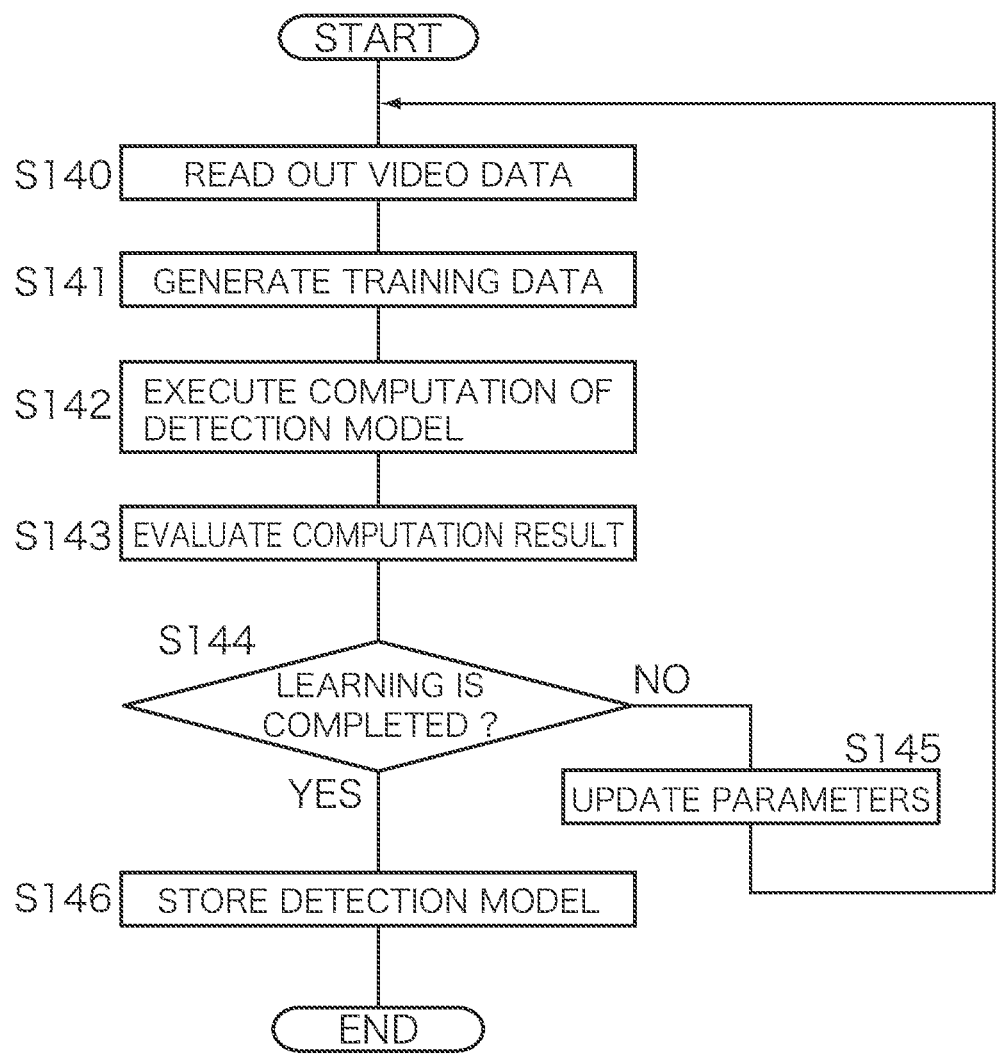
FIG. 10 is a flowchart illustrating the details of processing of generating the detection model.

FIG. 10 is a flowchart illustrating the details of the processing (S104) of generating the detection model. In this processing, the detection model is generated for each service, in accordance with the installation angle of the imaging device 200. Note that, a detection model customized for each user may be further generated. As advance preparation, corresponding correct data is generated for each of the video data pieces. Specifically, annotation of designating the region of the detection target is implemented for the video data stored in the video database DB1. As illustrated in FIG. 5, the data of the designated region is stored in the storage unit 102, as the correct data with respect to the video data. At the initial stage before the learning is started, the annotation is implemented by the hand of the operator. As the learning progresses, the correct data may be generated by using a detection result of the detection model MD4A to automatically implement the annotation.

In the case of generating the detection model MD4A for the imaging device 200A, the control unit 101 reads out the video data from the video database DB1, based on the device ID and the installation angle of the imaging device 200A (step S140). That is, the control unit 101 may search the video database DB1 by using the device ID and the installation angle (the azimuthal angle and the elevation angle) of the imaging device 200A in a search key, and may read out the video data with the coincident device ID and the coincident installation angle from the video database DB1. Note that, it is not necessary that the installation angles are completely coincident with each other, a predetermined error (for example, within 5 degrees) may be allowed for any one or both of the azimuthal angle and the elevation angle. Note that, only the installation angle may be used for the search key (the device ID is not used). In this case, the video data read out from the video database DB1 is not limited to the video data imaged by the imaging device 200A, and video data imaged by other imaging devices 200 can also be included. In addition, the coordinate data of the imaging device (may include not only the height but also the position coordinate according to GPS and the like) may be used for the search key, as a further and condition. The original intention of step S140 is to improve the accuracy of the detection model to be generated by maximally using data in the same condition of the past (an installation angle, an installation position, performance properties, environment properties and the like of cameras). Accordingly, in a case where the number of search keys decreases, the number of data pieces to be the target increases, but the quality of each of the data pieces may be degraded, and in a case where the number of search keys increases, the opposite may occur. Therefore, it is important to use a suitable search key without deficiency and excess.

The control unit 101 specifies the corresponding correct data with respect to each of the video data pieces read out in step S140, and generates the training data in which the video data and the correct data are set (step S141). The control unit 101 inputs the video data included in the selected training data to the detection model MD4A, and executes the computation of the detection model MD4A (step S142). Note that, an initial value is set in a model parameter of the detection model MD4A at the stage before the learning is started.

The control unit 101 evaluates the computation result of the detection model MD4A (step S143), and determines whether the learning is completed (step S144). The control unit 101 is capable of evaluating the computation result by using an error function (such as an objective function, a loss function, and a cost function) set based on the computation result of the detection model MD4A and the correct data included in the training data. The control unit 101, for example, determines that the learning is completed in a case where the error function is a threshold value or less (or a threshold value or more) while optimizing (minimizing or maximizing) the error function by a gradient descent method such as a steepest descent method.

In a case where it is determined that the learning is not completed (S144: NO), the control unit 101 updates the parameters (such as the weighting and the bias between the nodes) of the detection model MD4A (step S145), and returns the processing to step S141. The control unit 101 is capable of updating the parameter of the detection model MD4A by using an error back propagation algorithm for sequentially updating the weighting and the bias between the nodes from an output layer toward an input layer of the detection model MD4A.

In a case where it is determined that the learning is completed (S144: YES), the learned detection model MD4A is obtained, and thus, the control unit 101 stores the learned detection model MD4A in the storage unit 102 (step S146). In this case, as illustrated in FIG. 6, the control unit 101 stores the detection model MD4A in the storage unit 102 in association with the device ID and the service ID. Note that, as described above, in the case of generating the detection model customized for each user, the detection model may be stored even in association with the user ID.

In the flowchart of FIG. 10, the procedure of generating the detection model MD4A for the imaging device 200A has been described, but the other detection models MD4B and MD4C can also be generated by the same procedure.

In addition, in a case where the installation angles of the imaging devices 200A and 200B are substantially the same, it is not necessary to individually generate each of the detection models MD4A and MD4B, and for example, the detection model MD4A may be generated, and then, the detection model MD4B may be generated by finely tuning the generated detection model MD4A.

In this embodiment, a configuration has been described in which the detection model MD4A is generated in the server 100, but the detection model MD4A may be generated by an external server. In this case, the server 100 may acquire the learned detection model MD4A generated on the outside through communication or a recording medium, and may store the acquired detection model MD4A in the storage unit 102.

Figure 11:
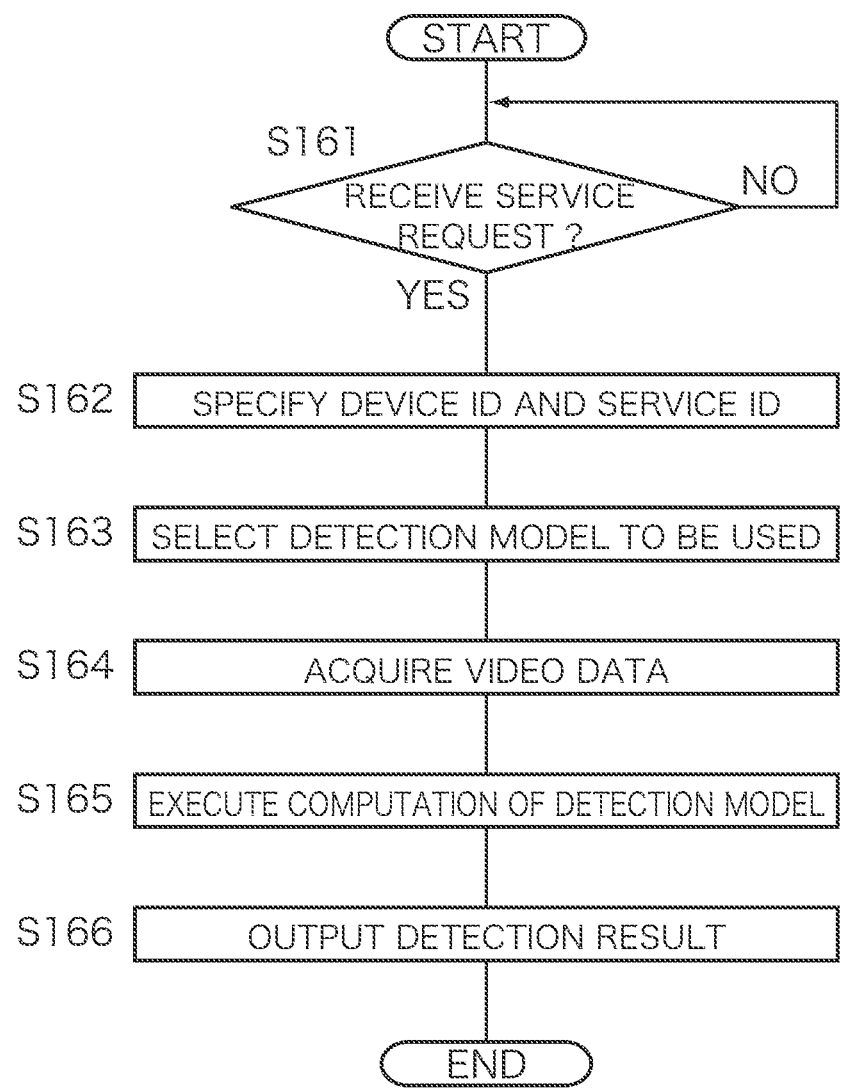
FIG. 11 is a flowchart illustrating the details of processing of providing a service.

FIG. 11 is a flowchart illustrating the details of the processing (step S107 or S108) of providing the service. Note that, hereinafter, a case will be described in which the processing is executed on the server 100 (step S108), but the processing may be executed on the imaging device 200 (step S107). In this case, data exchange between the imaging device 200 and the user terminal is performed through the server 100. The control unit 101 of the server 100 determines whether a service request is received from the user of the imaging device 200 (step S161). The control unit 101 is capable of receiving the service request from the terminal device of the user, which is not illustrated, through the communication unit 103. Note that, here, the service, for example, indicates various types of functions from a simple function such as "detection a person" to a multiple function such as "detecting a person bumped into something". In addition, in the service request, the user ID, the device ID, and the service ID are included. For example, as the user logs into the system from the user terminal, the user ID corresponding to the user is set. In addition, as the user selects the imaging device 200 through UI, the device ID corresponding to the imaging device 200 is set. In addition, as the user selects the service through the UI, the service ID corresponding to the service is set. In a case where it is determined that the service request is not received (S161: NO), the control unit 101 waits until the service request is received.

In a case where the service request is received (S161: YES), the control unit 101 specifies the device ID and the service ID (step S162). Note that, as described above, in the case of generating the detection model customized for each of the users, the user ID is further specified. The control unit 101 searches the user database DB2, based on the device ID and the service ID, thereby selecting the detection model to be used (step S163). Specifically, the detection model with the coincident device ID and the coincident service ID is selected from the detection models illustrated in FIG. 6. Note that, as described above, in the case of generating the detection model customized for each of the users, the detection model even with the coincident user ID is selected. Here, the detection model MD4A is selected.

The control unit 101 acquires the video data that is transmitted from the imaging device 200 corresponding to the device ID through the communication unit 103 (step S164). The control unit 101 inputs the video data acquired in step S164 to the detection model MD4A selected in step S163, and executes the computation of the detection model MD4A (step S165).

The control unit 101 outputs information according to the computation result of the detection model MD4A, as the detection result (step S166). The control unit 101 may transmit the detection result to the terminal device of the user, which is not illustrated, through the communication unit 103.

As described above, in this embodiment, it is possible to provide a service desired by the user with a suitable detection model according to the installation angle of the imaging device 200, by using the video of the imaging device 200 selected by the user. In addition, the server 100 collects the video data in association with the installation angle, and thus, is capable of extracting the video data imaged at substantially the same setting angle from the video database DB1 by searching the installation angle as the search key. In addition, it is possible to improve the accuracy of the detection model MD4A and the like by performing the learning using such video data.

The embodiment disclosed herein is to be considered illustrative in all respects and not restrictive. The scope of the present invention is indicated by the claims but not the meaning described above, and is intended to include all modifications within the scope and the meaning equivalent to the claims.

It is noted that, as used herein and in the appended claims, the singular forms "a", "an", and "the" include plural referents unless the context clearly dictates otherwise.

What is claimed is:

1. An information processing system which provides information about a physical object shown in a video captured by a fixed network camera, wherein the fixed network camera is fixedly placed in a certain position relative to a ground surface, wherein the information processing system is configured to:
    acquire first video data from the fixed network camera which is fixedly placed in the certain position; and
    estimate an installation angle of the fixed network camera in the certain position based on the first video data,
    when it is determined the installation angle of the fixed network camera is changed from an original installation angle of the fixed network camera to a changed installation angle different from the original installation angle due to an external factor, the information processing system is configured to:
        acquire second video data from the fixed network camera which is fixedly positioned at the changed installation angle different from the original installation angle;
        generate a detection model configured to detect and output the information about the physical object from the video, based on the second video data captured at the changed installation angle different from the original installation angle; and
        output, by the detection model, the information about the physical object by inputting the second video data captured at the changed installation angle different from the original installation angle to the detection model,
    wherein the detection model is a learning model trained to output the information about the physical object when the first or second video data is input.

2. The information processing system according to claim 1, wherein the information processing system is further configured to:
    output coordinate data of a ground level included in the video by inputting the first or second video data to a first estimation model in estimation of the installation angle.

3. The information processing system according to claim 1, wherein the information processing system is further configured to:
    output coordinate data of the fixed network camera by inputting the first or second video data and coordinate data of a ground level included in the video to a second estimation model in estimation of the installation angle.

4. The information processing system according to claim 1, wherein the information processing system is further configured to:
    output the installation angle of the fixed network camera by inputting coordinate data of the fixed network camera and coordinate data of a reference point included in the video to a third estimation model in estimation of the installation angle.

5. The information processing system according to claim 1, wherein the information processing system is further configured to:
> read out a video considered to have the changed installation angle from the video captured by the fixed network camera in generation of the detection model.

6. The information processing system according to claim 1, wherein the information processing system comprises the fixed network camera and a server device connected to the fixed network camera through a communication network.

7. The information processing system according to claim 6, wherein the server device is configured to estimate the installation angle of the fixed network camera and generate the detection model.

8. The information processing system according to claim 6, wherein the server device is configured to provide the information about the physical object.

9. The information processing system according to claim 6, wherein the fixed network camera is configured to provide the information about the physical object.

10. The information processing system according to claim 1, wherein the physical object is a moving object.

11. An information processing system which provides information about a physical object shown in a video captured by a fixed network camera, wherein the fixed network camera is fixedly placed in a certain position relative to a ground surface,
> wherein the information processing system is configured to:
> acquire first video data from the fixed network camera which is fixedly placed in the certain position;
> estimate an installation angle of the fixed network camera in the certain position based on the first video data,
> when it is determined the installation angle of the fixed network camera is changed from an original installation angle of the fixed network camera to a changed installation angle different from the original installation angle due to an external factor, the information processing system is configured to:
> > acquire second video data from the fixed network camera which is fixedly positioned at the changed installation angle different from the original installation angle;
> > generate a detection model configured to detect and output the information about the physical object from the video, based on the second video data captured at the changed installation angle different from the original installation angle; and
> > output, by the detection model, the information about the physical object by inputting the second video data captured at the changed installation angle different from the original installation angle to the detection model,
> wherein the detection model is a learning model trained to output the information about the physical object when the first or second video data is input, and
> wherein the information processing system is further configured to:
> > select the detection model corresponding to the fixed network camera and a service for providing the information about the physical object from a plurality of detection models in provision of the service in response to an indication of the fixed network camera and the service by a user; and
> > store an identifier of the fixed network camera, an identifier of the service for providing the information about the physical object, and the detection model in association with each other.

12. An information processing system which provides information about a physical object shown in a video captured by a fixed network camera, wherein the fixed network camera is fixedly placed in a certain position relative to a ground surface,
> wherein the information processing system is configured to:
> acquire first video data from the fixed network camera which is fixedly placed in the certain position;
> estimate an installation angle of the fixed network camera in the certain position based on the first video data,
> when it is determined the installation angle of the fixed network camera is changed from an original installation angle of the fixed network camera to a changed installation angle different from the original installation angle due to an external factor, the information processing system is configured to:
> > acquire second video data from the fixed network camera which is fixedly positioned at the changed installation angle different from the original installation angle;
> > generate a detection model configured to detect and output the information about the physical object from the video, based on the second video data captured at the changed installation angle different from the original installation angle; and
> > output, by the detection model, the information about the physical object by inputting the second video data captured at the changed installation angle different from the original installation angle to the detection model,
> wherein the detection model is a learning model trained to output the information about the physical object when the first or second video data is input, and
> wherein the information processing system is further configured to:
> > read out a video considered to have the changed installation angle from videos captured by a plurality of fixed network cameras also provided in addition to the fixed network camera in generation of the detection model; and
> > store an identifier of the fixed network camera, the installation angle, and the first and second video data in association with each other.

* * * * *